United States Patent
Oosterholt et al.

(10) Patent No.: US 10,963,136 B2
(45) Date of Patent: Mar. 30, 2021

(54) HIGHLIGHTING OF OBJECTS ON A DISPLAY

(75) Inventors: Ronaldus Hermanus Theodorus Oosterholt, Eindhoven (NL); Handoko Kohar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 858 days.

(21) Appl. No.: 13/816,753

(22) PCT Filed: Aug. 11, 2011

(86) PCT No.: PCT/IB2011/053578
§ 371 (c)(1),
(2), (4) Date: Feb. 13, 2013

(87) PCT Pub. No.: WO2012/023089
PCT Pub. Date: Feb. 23, 2012

(65) Prior Publication Data
US 2013/0145320 A1    Jun. 6, 2013

(30) Foreign Application Priority Data
Aug. 16, 2010 (EP) ..................................... 10172855

(51) Int. Cl.
*G06F 3/0484* (2013.01)
*G06F 3/0481* (2013.01)
*G06F 3/0485* (2013.01)

(52) U.S. Cl.
CPC ........ *G06F 3/04842* (2013.01); *G06F 3/0485* (2013.01); *G06F 3/04812* (2013.01); *G06F 3/04817* (2013.01)

(58) Field of Classification Search
CPC ............. G06F 3/04812; G06F 3/04842; G06F 3/0488; G06F 3/04817; G06F 3/0346; G06F 3/0484
(Continued)

(56) References Cited

U.S. PATENT DOCUMENTS

| | | | | |
|---|---|---|---|---|
| 4,698,625 A | * | 10/1987 | McCaskill | G06F 3/04845 345/157 |
| 5,905,497 A | * | 5/1999 | Vaughan et al. | 345/672 |

(Continued)

FOREIGN PATENT DOCUMENTS

| | | |
|---|---|---|
| EP | 1560105 A2 | 8/2005 |
| JP | H08115197 A | 5/1996 |

(Continued)

OTHER PUBLICATIONS

Yves Guiard et al., "Object Pointing: A Complement to Bitmap Pointing in GUIs", GI '04 Proceedings of Graphics Interface 2004, [Online] Jan. 1, 2004 (Jan. 1, 2004), pp. 9-16, XP55014665, http://dl.acm.org/citation.cfm?id=1006060>.

(Continued)

*Primary Examiner* — Sang H Kim

(57) ABSTRACT

A method and apparatus are described for controlling a highlighting of one of a plurality of operational objects on a display. A spatially continuous movement of a pointing position on the display, which is provided by a user by means of a user input interface is converted in the highlighting of one of the plurality of objects. If the pointing position coincides with one of the plurality of objects, this object is highlighted (130). When the pointing position is on empty space between the objects, an appropriate one of the plurality of objects is highlighted (160). The parameter used to determine the object to be highlighted is at least the distance from the pointing position to the objects.

12 Claims, 3 Drawing Sheets

(58) Field of Classification Search
USPC .................................. 715/858, 856, 862
See application file for complete search history.

(56) References Cited

U.S. PATENT DOCUMENTS

| | | | |
|---|---|---|---|
| 5,990,862 A | 11/1999 | Lewis | |
| 7,302,650 B1* | 11/2007 | Allyn .................. | G06F 3/04812 715/792 |
| 7,689,936 B2* | 3/2010 | Rosel .................. | G06F 3/04842 715/822 |
| 8,281,258 B1* | 10/2012 | Dixon et al. .................. | 715/854 |
| 2004/0141011 A1 | 7/2004 | Smethers | |
| 2007/0002077 A1* | 1/2007 | Gopalakrishnan ........................... | H04N 1/32144 345/619 |
| 2007/0209017 A1 | 9/2007 | Gupta | |
| 2008/0094356 A1* | 4/2008 | Ording ................ | G06F 3/04886 345/157 |
| 2008/0229254 A1* | 9/2008 | Warner .................. | 715/856 |
| 2009/0066648 A1* | 3/2009 | Kerr ...................... | G06F 3/0346 345/158 |
| 2009/0115723 A1* | 5/2009 | Henty .................... | 345/158 |
| 2009/0249257 A1* | 10/2009 | Bove et al. .................. | 715/858 |
| 2009/0303204 A1* | 12/2009 | Nasiri et al. .................. | 345/184 |
| 2010/0185681 A1* | 7/2010 | Han .................... | G06F 3/04817 707/802 |
| 2011/0109544 A1 | 5/2011 | Kitagawa | |
| 2011/0138324 A1* | 6/2011 | Sweeney ................ | G06F 3/0481 715/800 |
| 2011/0164055 A1* | 7/2011 | McCullough ....... | G06F 3/04883 345/642 |
| 2013/0124978 A1* | 5/2013 | Horns ................... | G06F 40/169 715/243 |

FOREIGN PATENT DOCUMENTS

| | | |
|---|---|---|
| JP | 2006221301 A | 8/2006 |
| JP | 2010072905 A | 4/2010 |
| JP | 2011005405 A | 1/2011 |
| TW | 416209 B | 12/2000 |
| WO | WO2009128148 A1 | 10/2009 |

OTHER PUBLICATIONS

Blanch R. et al., "Semantic Pointing: Improving Target Acquisition with Control-Display Ratio Adaptation", CHI 2004, Apr. 24-29, 2004, Vienna, Austria, vol 6, No. 1, pp. 519-526.

* cited by examiner

HIGHLIGHTING OF OBJECTS ON A DISPLAY

BACKGROUND OF THE INVENTION

Technical Field

The present invention relates to the field of user interfaces for displays and more particularly to the control of a highlighting of one of a plurality of objects on a display.

Description of Related Art

Currently, on-screen user interfaces on many consumer electronic devices such as TV's provide a 'jumping highlight' User Interface (UI) paradigm. Therein a distinct visual indication, which is usually controlled by means of four-way cursor keys, can be moved over the objects shown on the screen.

On the other hand, computer devices typically provide a 'pointer' based UI paradigm. Therein the x/y position of a graphical onscreen element, usually referred to as 'cursor', is directly controlled through a 'two-dimensional' input device, such as a mouse or a trackpad.

Jumping highlight based UI's are hampered by the fact that the user needs to repeatedly press distinct physical buttons, usually the cursor keys on his remote control, to control and move the highlight around. They tend to be inefficient and/or slow, in particular if the highlight needs to be moved between objects on different sides of the screen with many other objects located between them.

On the other hand, pointer UI's require their cursor to be positioned on top of an object in order for the object to be highlighted. The pointer can accidentally be positioned by a user on empty, non-functional screenspace. However, compared to a jumping highlight, controlling the position of the cursor is much more effective and efficient due to the 'analogue/spatial' qualities of the input devices used for the cursor control, such as a trackpad or a mouse.

A User Interface dealing with the some of these problems is disclosed in the article by Guiard et al: Object Pointing: A Complement to Bitmap Pointing in GUIs; Proceedings of the SIGCHI conference on Human factors in computing systems Vienna, 2004. This article describes a concept called object pointing, which is an interaction technique based on a special screen cursor that skips empty spaces. However, as described in section 3.2 and shown in FIG. 2 of this article the movement of the special screen cursor is not continuous. As a result, the distance of the movement of the mouse with which the special screen cursor is moved does not correspond to the distance of movement of the special screen cursor itself. This effect is stronger when there are few objects on the display separated by large empty spaces. Consequently, the position control may be perceived by users as inconvenient.

SUMMARY OF THE INVENTION

It would be desirable to provide an efficient navigation strategy for a user interface moving the highlight in a more controlled and proportional way.

To better address this concern, according to an aspect of the invention a method is provided of controlling a highlighting of one of a plurality of objects on a display. A spatially continuous movement of a pointing position on the display is obtained, which pointing position is provided by means of a user input interface. As long as the pointing position coincides with a first one of the plurality of objects, the first one of the plurality of objects is controlled to be highlighted. When the pointing position approaches a second one of the plurality of objects, the highlighting is controlled to jump from the first one to the second one of the plurality of objects. This works especially well when there is empty space between at least some of the objects.

The spatially continuous movement of the pointing position may be provided by a spatial input device, such as a trackpad or a mouse. The highlight by definition is always positioned on one of the (functional) objects, it cannot be positioned on empty space like a cursor. At the same time the spatial input device moves the highlight in a more proportional way. Movement on the input side will reflect the size of onscreen objects: for example to navigate the highlight across large objects will require larger (or faster) movements on the input device compared to smaller objects.

The control may offer speed-based acceleration much like a computer cursor. This means that slow movements on the input device enable the user to very accurately control the highlight for example on an onscreen keyboard with many small adjacent keys, while faster movements enable the user to quickly navigate the highlight from one side of the screen to the other.

According to an embodiment of the present invention, the jumping of the highlighting is controlled based on a distance of the pointing position to at least said second one of the plurality of objects. For example, if the pointing position comes within a certain distance from the second object, the highlighting jumps thereto.

The jumping of the highlighting may be controlled additionally based on a distance of the pointing position to said first one of the plurality of objects. For instance, the jumping may be performed when the distance to the second object becomes smaller than the distance to the first object. Hysteresis may be added to the calculated distances in order to avoid the highlighting jumping back and forth when the pointing position remains in between them for some time.

The jumping of the highlighting may be controlled additionally based on a direction of the movement of the pointing position. For example, jumping to relatively close objects may be avoided if the pointing position moves away from them, because it is clear that the user does not intend to highlight them.

The jumping of the highlighting may be controlled additionally based on a velocity or an acceleration/deceleration of the movement of the pointing position. For example, jumping may be avoided in case of a slight overshoot by the pointing position of a certain object and a strong deceleration and/or low velocity, because it is clear that the user just moved the pointing position a bit too far and does not intend to move to another object.

According to a further embodiment of the present invention, the pointing position is not displayed. As a result of using such a 'virtual cursor' the user is not distracted by additional information on the display. Furthermore, the pointing position can be beyond the display. This aspect can be used for implementing additional functionalities. For example, if at least some of the plurality of objects are placed in a row and if the pointing position is beyond the display in a prolongation of the row, the plurality of objects in the row may be controlled to scroll over the display. A speed of scrolling may be dependent on a distance of the pointing position to the display.

According to a still further embodiment, after the continuous movement of the pointing position has ended, a last highlighted object is controlled to remain highlighted. The operation corresponding to the highlighted object may then be confirmed by the user, for example by using a confirmation key. Alternatively, the ending of the continuous movement itself serves as the confirmation of the operation corresponding to the highlighted object. When the continuous movement of the pointing position is started, the pointing position is controlled to be at the center of a currently highlighted object. This way of interacting has resulted to be natural and understandable for the user.

Preferably, the method according to the invention is implemented by means of a computer program.

The computer program may be embodied on a computer readable medium or a carrier medium may carry the computer program.

According to a further aspect of the invention, an apparatus is provided comprising a controller for controlling a highlighting of one of a plurality of objects on a display, the controller being configured for:

obtaining a spatially continuous movement of a pointing position on the display, which pointing position is provided by means of a user input interface, as long as the pointing position coincides with a first one of the plurality of objects, controlling the first one of the plurality of objects to be highlighted, and when the pointing position approaches a second one of the plurality of objects, controlling the highlighting to jump from the first one to the second one of the plurality of objects.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Figure 1:
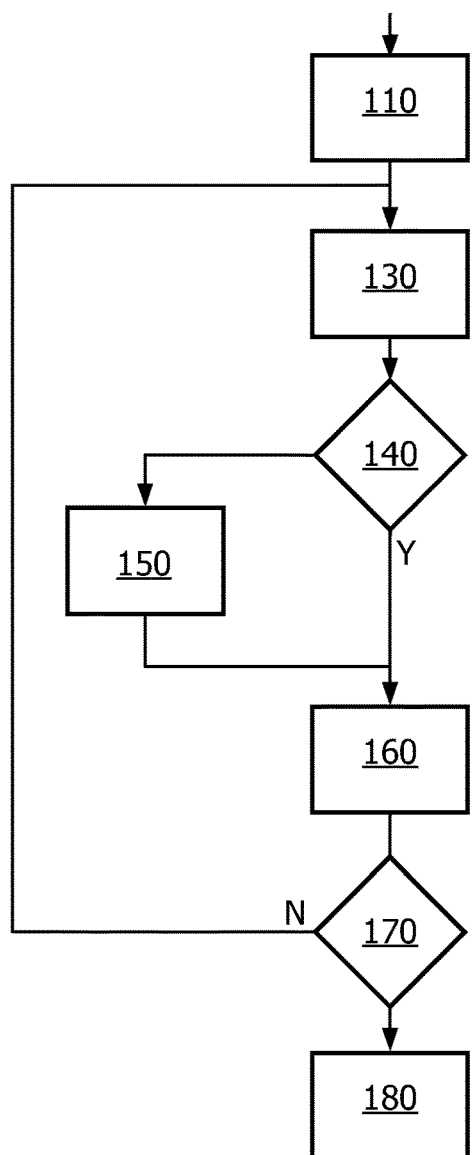
FIG. 1 shows a flowchart of the control of the highlighting of objects according to an exemplary embodiment of the invention.
Figure 2:
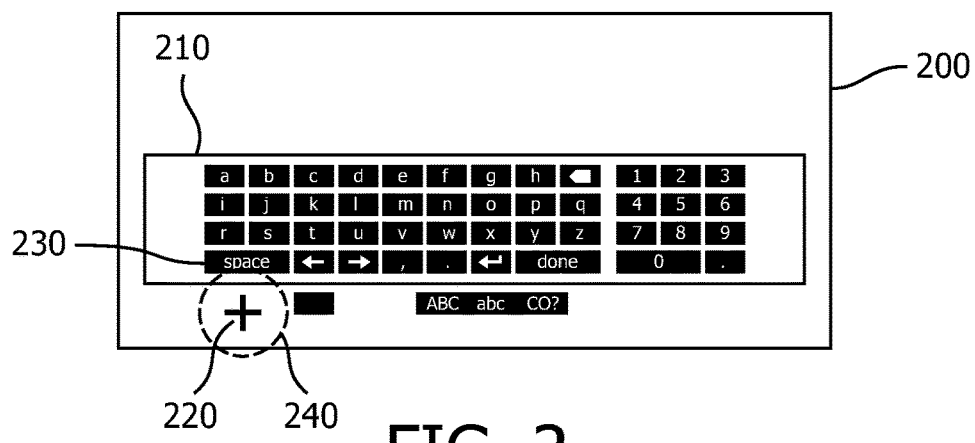
FIG. 2 shows a first example of highlighting one of the keys on an onscreen keyboard.
Figure 3:
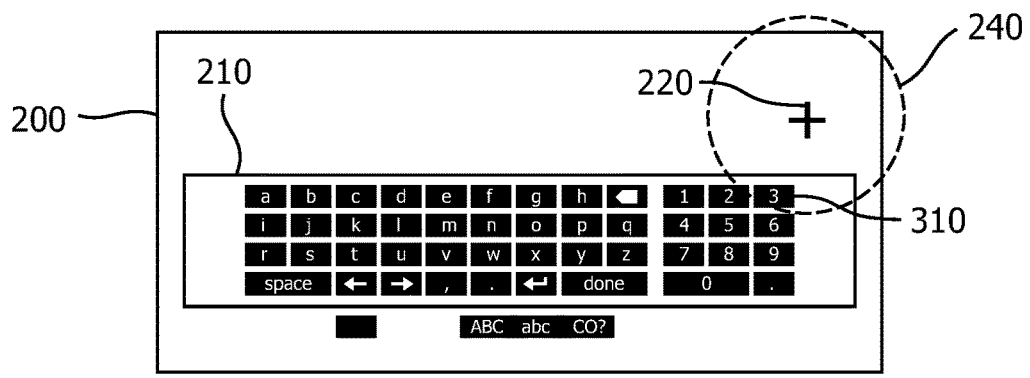
FIG. 3 shows a second example of highlighting one of the keys on an onscreen keyboard.

Referring to FIGS. 1-3 a first exemplary embodiment of the invention will be described. According to the embodiment, the user directly controls a pointing position, in this description also referred to as 'virtual cursor' by means of an input device. The input device used for moving the position may be any spatial 2D input device, such as a trackpad, trackball or a mouse. According to the embodiment, the virtual cursor is a concept and not an actually visible onscreen element. The virtual cursor behaves quite similar to a visible cursor on a PC, for example the navigation over a large distance requires a larger or faster movement on the mouse, trackball or trackpad than the navigation over a small distance. The fact that a fast movement over a certain distance on the input device results in navigation over a larger distance on the display than a slow movement over the same distance on the input device is known as "acceleration behaviour".

The virtual cursor behaves as follows. When the user touches the input device in order to start moving the virtual cursor, it is positioned on the center of the currently highlighted user interface object (step 110). As long as the virtual cursor is moved, the following steps are repeatedly executed, at small time intervals. The position of the virtual cursor is calculated (step 130). Then it is determined if the position corresponds to the position of one of a plurality of user interface objects on the display (step 140). If this is true, the corresponding object ('target object') is highlighted (step 160). If this is not true and the position of the virtual cursor corresponds to empty space on the display or is even beyond the display, the distance of the pointing position to the centers of all of the plurality of objects on the display is calculated and the object, which is closest to the pointing position, is determined (step 150). This object ('target object') is then highlighted. When the target object is different from the currently highlighted object then the highlight is moved to this new object. These steps are repeated after a brief time interval, as long as the user goes on with the spatially continuous movement of the virtual cursor. The movement of the virtual cursor's position is proportional to the movement of the finger on the trackpad or the movement of the mouse. Upon release of the trackpad or lack of movement of the mouse for a certain time period (checked in step 170) the virtual cursor becomes inactive and the highlight remains positioned on the last target (step 180). As a result, there is always a highlighted object on the display, whatever the position of the virtual cursor is.

FIG. 2 shows a display 200 with an onscreen keyboard 210. The user has moved the virtual cursor 220 down and to the left. It should be noted that, although it is shown in the figure, preferably the virtual cursor is not visible on the display. As a result of the movement of the cursor the highlight has jumped to the 'space' key 230 as this is the button closest to the cursor, as illustrated by the circle 240 around the virtual cursor and passing through the centre of the space key.

In the example shown in FIG. 3 the virtual cursor is moved up and to the right, and the highlight moves to the nearest key, in this example the '3' button 310. Although the virtual cursor is positioned a considerable distance from the keyboard, the highlight still remains inside the keyboard as there is no other target object closer by.

Figure 7:
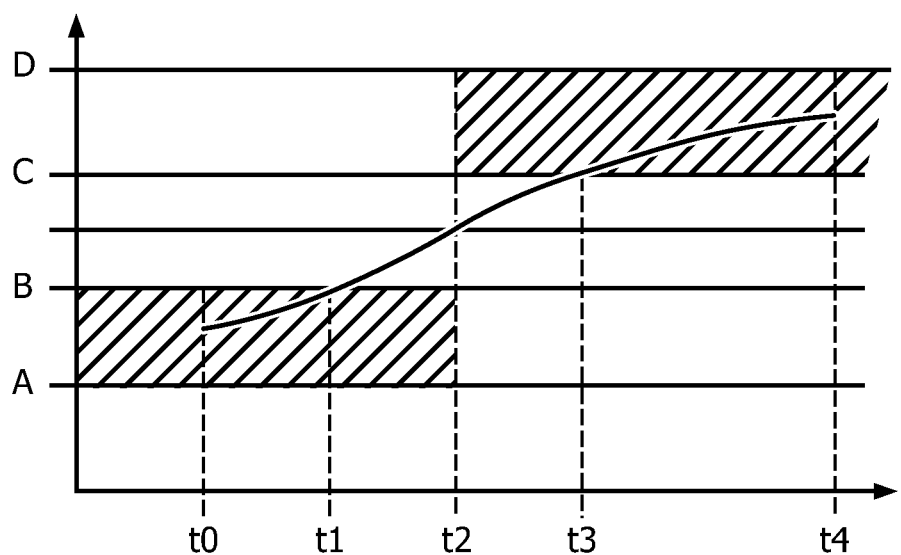
FIG. 7 shows the highlighting of objects and the movement of the pointing position in a single direction as a function of time for the embodiment according to FIG. 1.

FIG. 7 shows the trajectory of the virtual cursor (vertical axis) and the highlighting of objects 'A-B' and 'C-D' as a function of time (horizontal axis) for the case of a spatial continuous movement of the virtual cursor in a single direction (i.e. a straight movement). At time $t_0$ the user touches the input device, resulting in the continuation of the highlighting (shown in the graphic by means of the previous highlighted object 'A-B' and the positioning of the virtual cursor at the center of this object. The user than starts moving the virtual cursor, as shown in the graphic by the continuous line. At time $t_1$ the virtual cursor starts to cross the empty space between the objects 'A-B' and 'C-D'. However, since the distance from the virtual cursor to the center of object 'A-B' is smaller than the distance from the virtual cursor to the center of object 'C-D', object 'A-B' continues to be highlighted. At time $t_2$ the distance from the virtual cursor to the center of object 'C-D' becomes smaller than the distance from the virtual cursor to the center of object 'A-B' and as a consequence the highlighting jumps from object 'A-B' to 'C-D'. At $t_3$ the virtual cursor stops crossing the empty space and moves over the object 'C-D'. However, since the virtual cursor is invisible on the display, this is not noticeable. At $t_4$ the user stops moving and releases the input device. Consequently, the virtual cursors becomes inactive and the highlight remains on the object 'C-D'.

Figure 4:
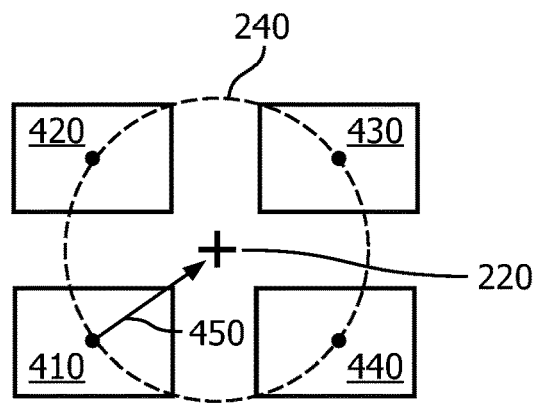
FIG. 4 shows a further embodiment according to the present invention wherein the direction of movement of the pointing position is taken into account.

In the embodiment described with reference to FIGS. 1-3 and 7, the decision which object becomes the target object is based only on the distance from that object to the virtual cursor. In some layouts it can be advantageous, that apart from the distance also other parameters are taken into account. A useful parameter is the trajectory of the virtual cursor and in particular the direction thereof. FIG. 4 shows an exemplary embodiment wherein both the distance and the direction of movement of the virtual cursor 220 are taken into account. Here, the virtual cursor started moving at the center of a first object 410 in between two other objects 420, 440 towards object 430. The virtual cursor is at an equidistant position from the centers of all four objects 410, 420, 430, 440. However, in view of the trajectory 450 of the virtual cursor, which clearly goes in the direction of object 430, the latter object is highlighted. Preferably, the direction of the virtual cursor over a certain time interval is taken as input parameter in order to avoid that short inadvertent movements by the user of the virtual cursor have a detrimental effect.

Figure 5:
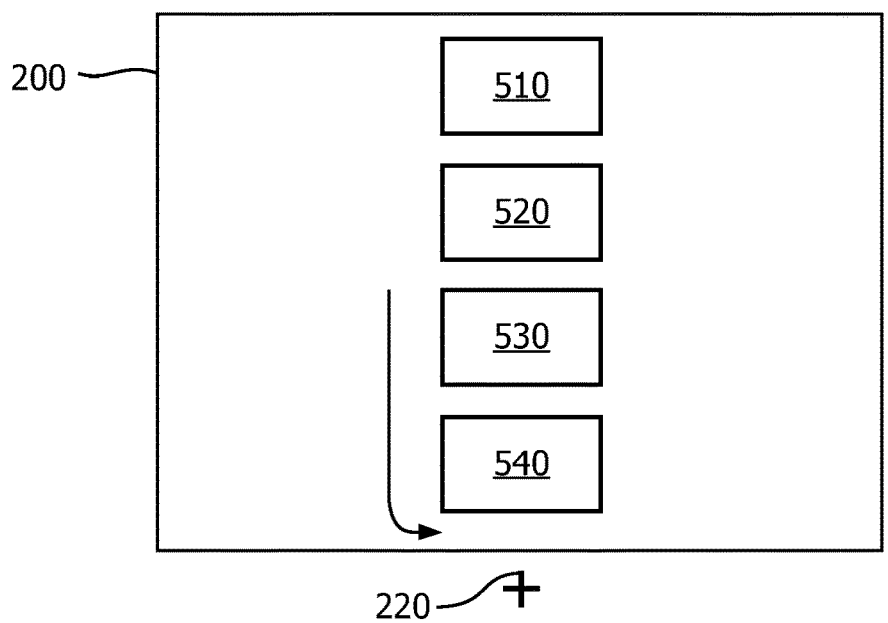
FIG. 5 shows a still further exemplary embodiment of the invention enabling the scrolling of objects by locating the pointing position beyond the display.

According to an exemplary embodiment the virtual cursor may be positioned beyond the display. This does not affect the highlighting, since this can be performed in the same way as when the virtual cursor is still positioned on the display by using the distances to the objects on the display and possibly other parameters. The distance that the virtual cursor may be positioned beyond the display may be limited to a maximum value, so that when this maximum value is reached, any further movements of the virtual cursor away from the display do not have any effect on its position. The positioning of the virtual cursor beyond the display may be used, as shown in FIG. 5, for additional functionalities. One such functionality is the scrolling of the objects 510, 520, 530, 540 placed in a row on the display 200 by placing the virtual cursor 220 beyond the display in a prolongation of the row. The speed of scrolling may be dependent on a distance of the virtual cursor to the display.

Figure 6:
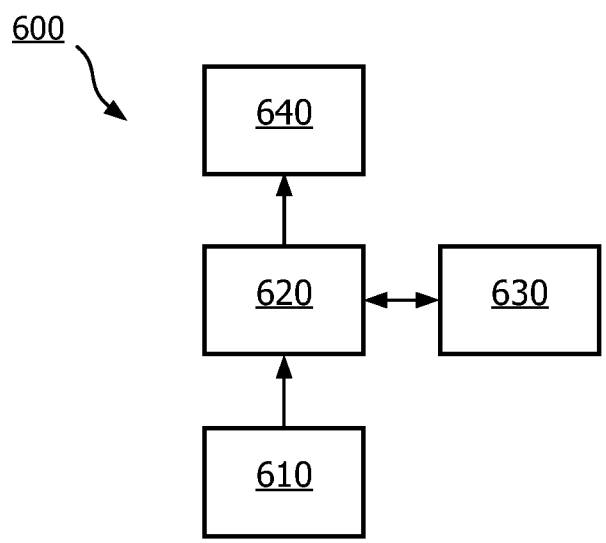
FIG. 6 shows a block diagram of an exemplary apparatus configured for implementing the present invention.

FIG. 6 shows a block diagram of an exemplary apparatus 600 configured for implementing the embodiments described herein above. Only those features relevant for understanding the present invention are shown. The apparatus comprises an input device 610, a controller (processor) 620 with an associated memory 630 and a display 640. The functionality shown in FIGS. 1-5 and 7 is preferably implemented by means of a suitable computer program loaded to the associated memory 630 of the processor 620.

The apparatus 600 may be an interactive TV and the input device 610 may be a remote control (RC) with a clickable trackpad. In this case, the remote control needs to be loaded with software to translate the movements of user over the trackpad to corresponding RC commands recognizable by the interactive TV. Based on these commands the movement of the virtual cursor is determined and 'translated' to an appropriate highlighting of one of the operational objects displayed on the TV.

While the invention has been illustrated and described in detail in the drawings and foregoing description, such illustration and description are to be considered illustrative or exemplary and not restrictive; the invention is not limited to the disclosed embodiments.

In this regard it is to be noted that the invention is not restricted to 2D but it can be extended to 1D or 3D situations.

Furthermore, additional parameters of the movement of the virtual cursor can be taken into account for determining the object to be highlighted. Examples thereof are the velocity or an acceleration/deceleration of the movement of the pointing position.

Furthermore, instead of making the pointing position invisible (the virtual cursor concept) a visible cursor may be used to indicate the pointing position.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a highlighting of one of a plurality of objects on a display, the method comprising:
    obtaining a spatially continuous movement of a virtual cursor on the display, wherein the virtual cursor is not displayed;
    when a distance between the virtual cursor and a center of a first one of the plurality of objects is shorter than a distance between the virtual cursor and a center of a second one of the plurality of objects, highlighting the first one of the plurality of objects displayed on the display so the highlight appears on the object; and
    when the distance between the virtual cursor and the center of the first one of the plurality of objects is longer than the distance between the virtual cursor and the center of the second one of the plurality of objects, controlling the highlighting to jump from the first one to the second one of the plurality of objects, wherein the jumping of the highlighting to a nearest object to the virtual cursor is controllably avoided if a direction of the movement is determined to be directed away from the nearest object.

2. The method according to claim 1, wherein the jumping of the highlighting is further controlled based on a velocity, an acceleration, or a deceleration of the movement of the virtual cursor.

3. The method according to claim 1, wherein the virtual cursor is beyond the display.

4. The method according to claim 3, further comprising placing at least some of the plurality of objects in a row; and
when the virtual cursor is beyond the display in a prolongation of the row, scrolling the plurality of objects in the row over the display.

5. The method according to claim 4, wherein a speed of scrolling is dependent on the virtual cursor to the display.

6. The method according to claim 1, wherein when the continuous movement of the virtual cursor has ended, controlling a last highlighted object to remain highlighted.

7. The method according to claim 1, further comprising, when the continuous movement of the virtual cursor is started, controlling the virtual cursor to be at the center of a currently highlighted object.

8. The method according to claim 1, further comprising adding a hysteresis to calculated distances between the virtual cursor and the center of the first one of the plurality of objects and the center of the second one of the plurality of objects to avoid the highlighting from jumping back and forth between two separate objects when the virtual cursor remains in between them for a period of time.

9. A non-transitory computer readable medium having a computer program code stored thereon which, when executed by a processor, cause the processor to:
obtain a spatially continuous movement of a virtual cursor on a display, wherein the virtual cursor is not displayed;
when a distance between the virtual cursor and a center of a first one of a plurality of objects is shorter than a distance between the virtual cursor and a center of a second one of the plurality of objects, highlight the first one of the plurality of objects displayed on the display so the highlight appears on the object; and
when the distance between the virtual cursor and the center of the first one of the plurality of objects is longer than the distance between the virtual cursor and the center of the second one of the plurality of objects, control the highlight to jump from the first one to the second one of the plurality of objects, wherein the jump of the highlight to a nearest object to the virtual cursor is controllably avoided if a direction of the movement is determined to be directed away from the nearest object.

10. An apparatus comprising:
a memory to store information; and
a control processor, responsive to said stored information, to control a highlighting of one of a plurality of objects on a display, the control processor being configured to:
obtain a spatially continuous movement of a virtual cursor on the display, wherein the virtual cursor is not displayed;
when a distance between the virtual cursor and a center of a first one of the plurality of objects is shorter than a distance between the virtual cursor and a center of a second one of the plurality of objects, highlight the first one of the plurality of objects displayed on the display so the highlight appears on the object; and
when the distance between the virtual cursor and the center of the first one of the plurality of objects is longer than the distance between the virtual cursor and the center of the second one of the plurality of objects, control the highlight to jump from the first one to the second one of the plurality of objects, wherein the jump of the highlight to a nearest object to the virtual cursor is controllably avoided if a direction of the movement is determined to be directed away from the nearest object.

11. The apparatus according to claim 10, wherein the control processor is further configured to:
control the jump of the highlight based on at least one of: a velocity of the virtual cursor, an acceleration of the virtual cursor and a deceleration of the virtual cursor.

12. The apparatus according to claim 10, wherein the control processor is further configured to:
when the continuous movement of the virtual cursor has ended, control a last highlighted object to remain highlighted; and
when the continuous movement of the virtual cursor is started, control the virtual cursor to be at the center of a currently highlighted object.

* * * * *